Feb. 16, 1960  R. A. ADEE  2,924,994
DIFFERENTIAL AND TRANSMISSION MECHANISM
Filed Oct. 24, 1958  2 Sheets-Sheet 1

INVENTOR.
Raymond A. Adee
BY
ATTORNEY

INVENTOR.
Raymond A. Adee

United States Patent Office 2,924,994
Patented Feb. 16, 1960

2,924,994

DIFFERENTIAL AND TRANSMISSION MECHANISM

Raymond A. Adee, Hutchinson, Kans., assignor to Hesston Manufacturing Co., Inc., Hesston, Kans., a corporation of Kansas Application October 24, 1958, Serial No. 769,347

18 Claims. (Cl. 74—722)

This invention relates to a transmission particularly adapted for use in farm implements for not only driving the ground-engaging wheels thereof, but for steering the vehicle both fore and aft at variable speeds.

It is the most important object of the present invention to provide belt and pulley arrangements including two different types of belt-tightening means for permitting an operator of a wheeled vehicle to not only guide the vehicle, but control its fore and aft movement and manipulate sharp or gradual turns merely by actuating a pair of levers or other easily maneuvered manual control means.

Still another object of the present invention is to incorporate in each of a pair of identical assemblies, a power transmitting unit also operating through use of belts and pulleys and permitting fine steering at variable speeds.

Still another object of the instant invention is to accomplish all of the aforementioned results through use of relatively simple, inexpensive parts that are easily assembled and maintained and capable of long service without excessive repair and replacement costs.

Figure 1:
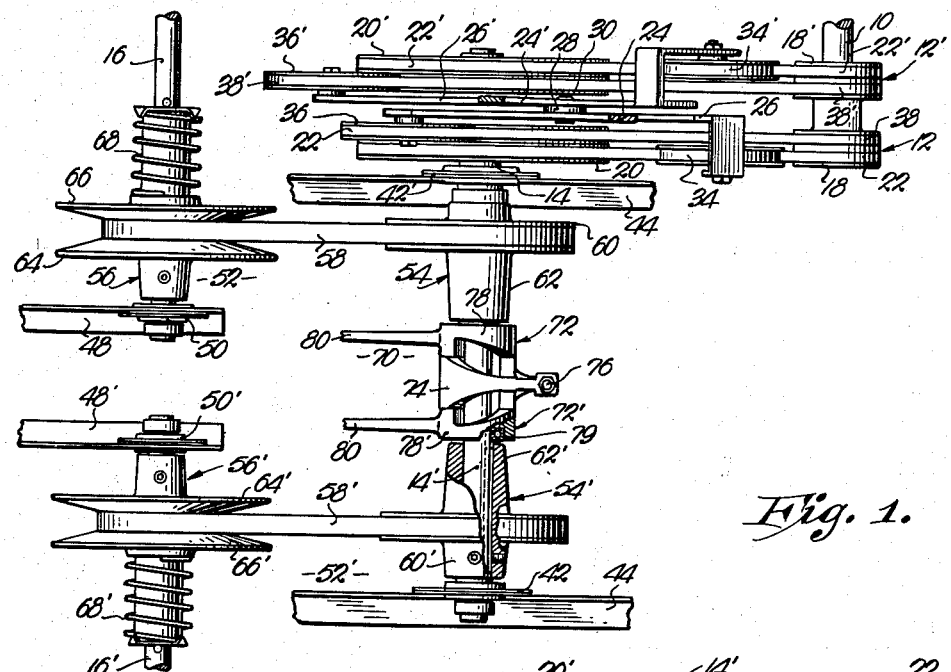
Fig. 1 is a fragmentary plan view of a differential and transmission mechanism made pursuant to my present invention, parts being broken away and in section for clearness.

It is desirable to utilize but a single engine or other prime mover (not shown) for operating the transmission illustrated in the drawings and, therefore, the first shaft 10 to be referred to is adapted for operable connection with such engine and is common to a first assembly 12 and a second assembly 12'.

Figure 2:
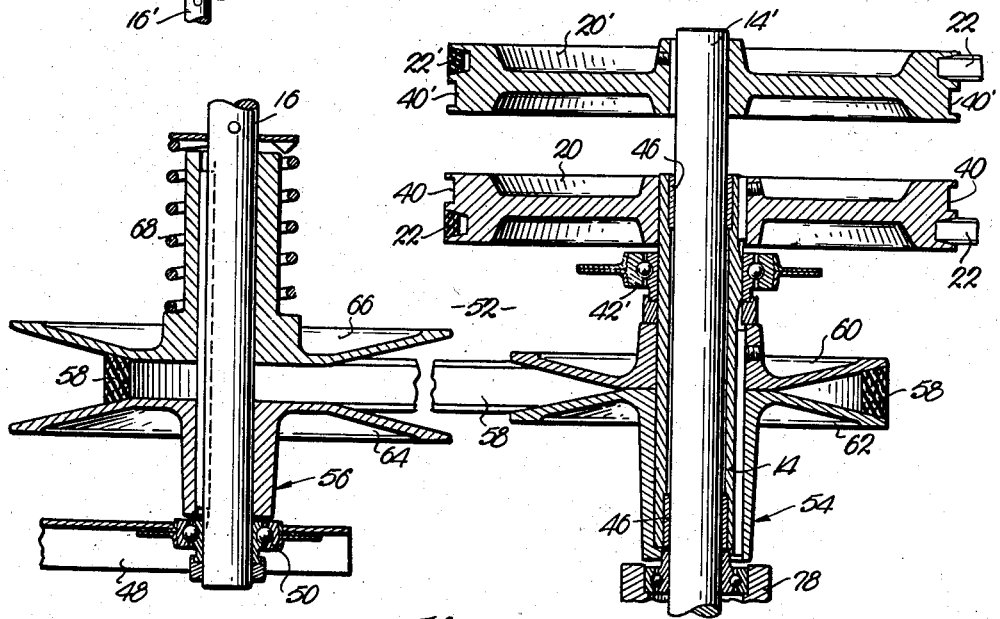
Fig. 2 is an enlarged, fragmentary, horizontal, cross-sectional view taken through a portion of the mechanism as shown in Fig. 1.
Figure 3:
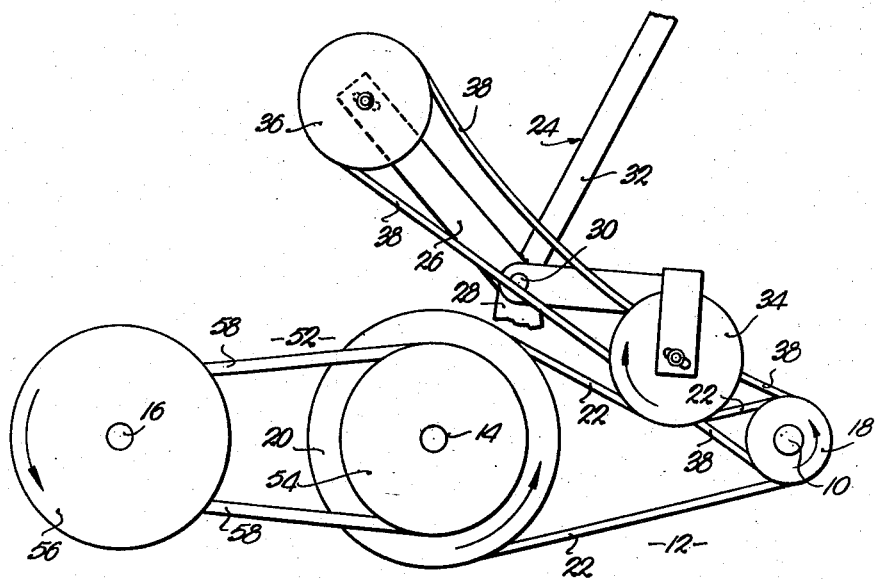
Fig. 3 is a schematic, elevational view showing one of the assemblies in position for driving its corresponding ground-engaging wheel in a forward direction.
Figure 4:
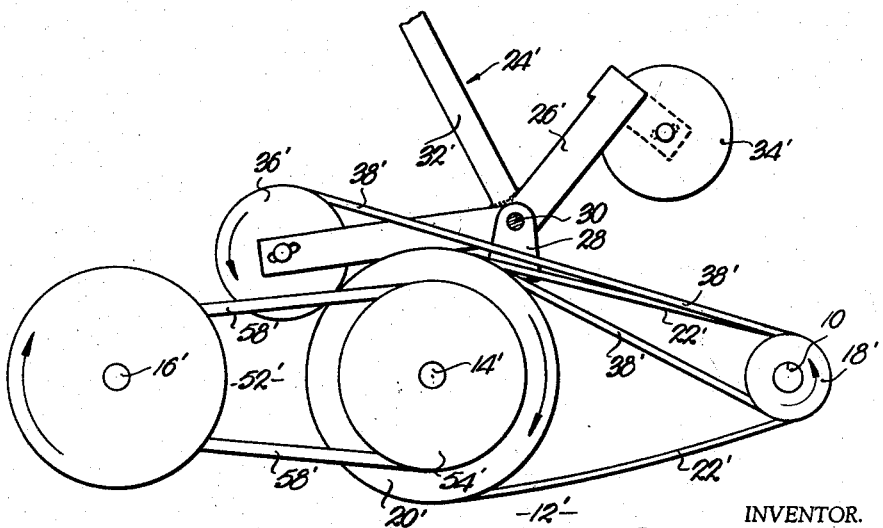
Fig. 4 is a view similar to Fig. 3 illustrating the second assembly but with its parts in position to drive its corresponding ground wheel in reverse.

The drive shaft 10 is driven continuously in one direction anticlockwise as shown by the arrows in Figs. 3 and 4, but the second and the third shafts for assemblies 12 and 12' respectively operate in either of two directions, depending upon the desires of the operator. The said second or idler shafts for assemblies 12 and 12' are designated by the numerals 14 and 14' respectively, it being noted in Fig. 2 that shaft 14 is in the nature of a tubular sleeve telescoped over the shaft 14' in coaxial relationship thereto. The aforementioned third shafts for assemblies 12 and 12' are designated by the numerals 16 and 16' respectively.

The vehicle with which the transmission is adapted to be used is not illustrated in the drawings, it being necessary to merely point out that a pair of ground-engaging wheels for the vehicle may be operably connected with driven shafts 16 and 16' respectively either directly or through a coupling such as a chain and sprocket wheel assembly.

Referring first to the assembly 12, a double-grooved wheel 18 rigid to shaft 10 and a double-grooved wheel 20 rigid to shaft 14, are interconnected by a first continuous belt 22. Control means for the first assembly 12, broadly designated by the numeral 24, includes a swingable member 26 in the nature of a substantially L-shaped crank mounted on stationary framework 28 through a horizontal pivot pin 30 intermediate the ends of the crank 26. Swinging of the crank 26 is effected through use of a lever 32 that is rigid to the crank 26.

The control means 24 includes additionally, a first sheave 34 and a second sheave 36 mounted on the crank 26 at the ends thereof, together with a second continuous belt 38 that interconnects the first grooved wheel 18 and the second sheave 36.

The arrangement is such that when the lever 32 is pulled rearwardly to the position shown in Fig. 3, sheave 34 is brought into engagement with the outer edge of the first belt 22 in tightening relationship thereto disposing the sheave 34 between the first wheel 18 and the second wheel 20. This drives the wheel 20 in the same direction as wheel 18 as indicated by the arrows in Fig. 3.

It can now also be appreciated that when the lever 32 is vertically disposed in a neutral position, wheel 18 runs idly and wheel 20 is at standstill. It can now also be seen by comparison with Fig. 4, that when the lever 32 is swung forwardly to tip or rock the crank 26 about pivot 30 in the opposite direction, belt 38 is brought into engagement with groove 40 (see Fig. 2) of wheel 20. This places the wheel 20 into tightening relationship to belt 38 between wheel 18 and sheave 36, whereby the wheel 20 is driven clockwise by wheel 18 as indicated by the arrows in Fig. 4.

Noteworthy at this juncture is the fact that wheel 18 runs idly within the belt 38 when sheave 34 is in operative engagement with the belt 22, and conversely, the wheel 18 runs idly within the belt 22 when the wheel 20 is in operative engagement with the belt 38.

Referring now to the second assembly 12', there is provided an identical arrangement for driving shaft 14' in either of two directions. Here again, double-grooved wheels 18' and 20' are secured to shafts 10 and 14' respectively. They are interconnected by a first belt 22'. Control means 24' includes a swingable member or crank 26' mounted on pivot pin 30 that is common to the two controls 24 and 24'. An operating lever 32' is rigid to crank 26' preferably adjacent the pivot pin 30 and crank 26' carries a first sheave 34' and a second sheave 36'. A second belt 38' interconnects wheel 18' and sheave 36'. When the belt 38' is in operative engagement with the wheel 20' as shown in Fig. 4, it seats within groove 40' (Fig. 2) of wheel 20'.

In Figs. 1 and 2 of the drawings it is seen that shafts 14 and 14' are journaled in bearings 42 and 42' respectively carried by framework 44 and that shaft 14' is journaled in bushings 46 within shaft 14. Shafts 16 and 16' are likewise provided with supporting bearings, one only of which is illustrated in Figs. 1 and 2 carried by framework 48 and designated by the numerals 50 and 50' respectively.

The assemblies 12 and 12' are also provided with power transmitting units in the nature of variable speed mechanisms designated broadly by the numerals 52 and 52' respectively, operably interconnecting their shafts 14—14' with their corresponding shafts 16—16'.

Referring first to the unit 52, as best seen in Fig. 2, a first variable speed, expansible pulley 54 on the shaft 14, and a second variable speed, expansible pulley 56 on shaft 16, are interconnected by a third continuous belt 58, Pulley 54 is provided with a pair of sections 60 and 62 shiftable relatively toward and away from each other, and the pulley 56 is provided with a similar pair of relatively shiftable sections 64 and 66. Sections 60 and 64 are rigid to shafts 14 and 16 respectively, whereas the sections 62 and 66 are mounted on shafts 14 and 16 respectively for rotation therewith, but sliding movement toward and away from their corresponding sections 60 and 64. Consequently, the diameters of the pulleys 54 and 56 may be varied as their sections 62 and 66 are shifted along the shafts 14 and 16 respectively. A spring 68 acting on section 66 of pulley 56 yieldably biases the section 66 toward the section 64.

In a similar manner, unit 52' is provided with a first variable speed, expansible pulley 54' on shaft 14', and a second variable speed, expansible pulley 56' on shaft 16' interconnected by a third belt 58'. Section 62' of pulley 54' is shiftable toward and away from section 60' and, in the pulley 56', section 66' is shiftable toward and away from section 64', spring 68' acting on section 66'.

Control mechanism for the power transmission units 52 and 52' shown in Fig. 1 of the drawings, is designated broadly by the numeral 70 and takes the form of a pair of expansible cam devices 72 and 72' mounted on the shaft 14' between sections 62 and 62' of pulleys 54 and 54' respectively. Shaft 14' passes freely through a rigid element 74 that is held in place against rotation and against reciprocation along the shaft 14' by a suitable fastener 76 secured to any stationary framework (not shown). The rigid element 74 of the control mechanism 70 is interposed between a pair of elements 78 and 78' that are rotatable on the shaft 14' (note bearing 79) and provided with laterally extending arms 80 and 80' for actuating the same.

The nature of the cam surfaces between elements 78 and 78' and their common intermediate rigid element 74, is obvious from inspection of Fig. 1 of the drawings. When the arms 80 and 80' are in the position illustrated in Fig. 1, the cam devices 72 and 72' are fully expanded, holding both sections 62 and 62' spread apart and against their corresponding sections 60 and 60'. As seen best in Fig. 2 therefore, pulleys 54 and 54' operate at their greatest diameter with belts 58 and 58' riding adjacent the peripheries thereof whenever the arms 80 and 80' are in the position shown in Fig. 1.

It is now clear that when the elements 78 and 78' are rotated to the position shown in Fig. 1, spreading the sections 62 and 62' apart, the springs 68 and 68' will readily yield to the movement of the sections 62 and 62' toward their corresponding sections 60 and 60', permitting the sections 66 and 66' of pulleys 56 and 56' to move away from corresponding sections 64 and 64'. Hence, as seen in Fig. 2, the belts 58 and 58' ride within the pulleys 56 and 56' adjacent the hubs or axes of rotation thereof.

Conversely, as the arms 80 and 80' are swung rearwardly toward the fastener 76 (see Fig. 1), the springs 68 and 68' automatically close the pulleys 56 and 56', causing the pulleys 54 and 54' to expand. Therefore, springs 68 and 68' cause the elements 78 and 78' to move toward each other and the sections 62 and 62' to follow inwardly toward the element 74 as the arms 80 and 80' are swung rearwardly toward the fastener 76.

As above mentioned, the transmission is in neutral and the implement with which the same is used, is at standstill whenever the levers 32 and 32' are in side-by-side relationship extending vertically upwardly from the common pivot 30.

In such neutral position, the sheaves 34 and 34' are retracted away from belts 22 and 22', and the belts 38 and 38' are retracted away from the grooved wheels 20 and 20'. Belts 22, 38, 22' and 38' all being slack, the shaft 10, and therefore, the two interconnected wheels 18 and 18', rigid to shaft 10, rotate idly counterclockwise viewing Figs. 3 and 4, within the belts 22, 38, 22' and 38'.

If both levers 32 and 32' are retracted rearwardly to the position shown in Fig. 3, sheaves 34 and 34' will tighten the belts 22 and 22' thereby driving shafts 16 and 16' counterclockwise, viewing Fig. 3, and the implement is driven forwardly along a straight path of travel and at a relatively slow speed, assuming as aforementioned, that the arms 80 and 80' are retracted rearwardly. If desired, the arms 80 and 80' may be controlled through foot pedals and, therefore, the speed of forward movement may be increased by shifting the arms 80 and 80' to the position shown in Fig. 1.

On the other hand, if both levers 32 and 32' are swung forwardly to the position shown in Fig. 4, the belts 22 and 22' will be slackened, stopping the forward movement and the belts 38 and 38' will be brought into engagement with wheels 20 and 20' within grooves 40 and 40' respectively. This causes the implement to move in reverse at a speed determined by the position of arms 80 and 80'.

The components of the transmission are illustrated in the drawings in a position where the implement is executing a sharp turn to the left at full speed. Since lever 32 is retracted rearwardly, shaft 16 is caused to rotate counterclockwise, viewing Fig. 3, and since the lever 32' is swung forwardly, the shaft 16' is caused to rotate clockwise. Since, therefore, the ground wheel connected with shaft 16, is being driven forwardly by shaft 10, and the ground wheel connected with shaft 16' is being driven rearwardly by shaft 10, a right angle turn to the left may be made. During such turning, the operator ordinarily would not actuate the arms 80 and 80' relatively, merely positioning the same so that the speed of turning is as fast as desired. However, it is possible, while turning, to increase or decrease the speed of the forwardly moving ground wheel by manipulation of arm 80 and/or increase or decrease the speed of the rearwardly traveling ground wheel by manipulating arm 80'.

It is obvious from the foregoing that when the positions of levers 32 and 32' are reversed in Figs. 3 and 4, lever 32 moved forwardly and lever 32' moved rearwardly, the implement will effect a sharp turn to the right.

It may not always be necessary in manipulating turns, for both assemblies 12 and 12' to be placed in operation. For example, one of the levers 32 or 32' may be shifted to neutral so that its corresponding ground wheel will not be driven in either direction. Thereupon, by manipulation of the other lever, its ground wheel may be caused to either move forwardly or rearwardly, thereby effecting a turn. And, here again, the speed of such turn may be varied by operation of either arm 80 or 80' as the case may be.

In any event, the control mechanism 70 is provided primarily for fine-line steering. At slow speeds over relatively smooth terrain, it is possible to guide the vehicle fairly well through use of the levers 32 and 32' only. However, at greater speeds and under conditions where uneven terrain tends to affect the straight line movement of the vehicle, the operator can guide the same easier and more effectively through use of the arms 80 and 80'.

By way of example, therefore, assuming both levers 32 and 32' to be retracted to the position shown in Fig. 3, and the vehicle therefore, moving forwardly, shifting of arms 80 and 80' relatively controls the speed of rotation of shafts 16 and 16'. Consequently, if the vehicle veers to the right, it can be quickly and easily turned back to the desired path of travel by retracting the arm 80' to decrease the speed of rotation of shaft 16' until the implement rights itself because of the fact that shaft 16 is then rotating faster than the shaft 16'. Any suitable past-center mechanism (not shown) may be provided to releasably hold the levers 32 and 32' in either of their two extreme positions. Similarly, a quickly releasable lock (not shown) may be employed to hold the arms 80 and 80' in the position shown in Fig. 1.

Having thus described the invention what is claimed as new and desired to be secured by Letters Patent is:

1. In a transmission, a first grooved wheel adapted to be driven continuously in one direction; a second grooved wheel rotatable alternately in opposite directions; a first belt interconnecting the wheels; control means provided with a first and a second sheave; and a second belt interconnecting the first wheel and the second sheave, said control means being movable whereby to alternately shift the first sheave into tight engagement with the first belt, thereby driving the second wheel in one direction, and to shift the second belt into tight engagement with the second wheel, thereby driving the latter in the opposite direction.

2. The invention of claim 1, said control means including a member mounted intermediate its ends for swinging movement, the sheaves being at each end respectively of the member.

3. The invention of claim 1, wherein is provided a pair of variable speed pulleys; a third belt operably interconnecting the pulleys; and control mechanism for said pulleys operably associated therewith, one of said pulleys being operably connected with said second wheel.

4. The invention of claim 1, wherein is provided a power transmitting unit having a pair of expansible pulleys, a third belt interconnecting the pulleys, each pulley having a pair of relatively shiftable sections whereby the diameters thereof may be varied, the sections of one pulley being spring-loaded relatively toward each other, and control mechanism operably connected with the other pulley for shifting its sections toward each other; and means operably coupling said unit with the second wheel.

5. A transmssion comprising a first shaft adapted to be driven continuously in one direction; a second shaft rotatable alternately in opposite directions; a grooved wheel rigidly secured to each shaft respectively; a first belt interconnecting the wheels; control means provided with a first and a second sheave; and a second belt interconnecting the wheel of the first shaft with the second sheave, said control means being movable whereby to alternately shift the first sheave into tight engagement with the first belt, thereby driving the second shaft in one direction, and to shift the second belt into tight engagement with the wheel of the second shaft, thereby driving the latter in the opposite direction.

6. The invention of claim 5, the first sheave being disposed between the wheels when the first sheave is in engagement with the first belt, the wheel of the second shaft being disposed between the second sheave and the wheel of the first shaft when the wheel of the second shaft is engaged by the second belt.

7. The invention of claim 5, each belt being provided with continuous inner and outer edges, the first sheave engaging the outer edge of the first belt when the second shaft is driven in said one direction, the wheel of the second shaft engaging the outer edge of the second belt when the second shaft is driven in said opposite direction.

8. The invention of claim 5, wherein is provided a power transmitting unit having a pair of expansible pulleys, a third shaft, a third belt interconnecting the pulleys, each pulley having a pair of relatively shiftable sections whereby the diameters thereof may be varied, the sections of one pulley being spring-loaded relatively toward each other, and control mechanism operably connected with the other pulley for shifting its sections toward each other; and means operably coupling said unit with the second shaft and with the third shaft.

9. In a transmission, a drive shaft; a pair of idler shafts; a driven shaft for each idler shaft respectively; variable speed mechanism connecting each idler shaft respectively with a corresponding driven shaft; belt and wheel means for each idler shaft respectively operably coupling the same with said drive shaft; and means for tightening the belts into operative connection with the idler shafts.

10. The invention of claim 8, said control mechanism including an expansible cam device having an element rotatable on the second shaft and engaging one of the sections of said other pulley.

11. A transmission comprising a pair of assemblies each provided with a first grooved wheel adapted to be driven continuously in one direction, a second grooved wheel rotatable alternately in opposite directions, a first belt interconnecting the wheels, control means provided with a first and a second sheave, and a second belt interconnecting the first wheel and the second sheave, said control means being movable whereby to alternately shift the first sheave into tight engagement with the first belt, thereby driving the second wheel in one direction, and to shift the second belt into tight engagement with the second wheel, thereby driving the latter in opposite direction; a first shaft common to the first wheels and rigidly secured thereto for driving the same; and a second shaft secured rigidly to the second wheel of each of said assemblies respectively to be driven thereby in opposite directions.

12. The invention of claim 11, the second shaft of one of said assemblies being tubular and being telescoped over the second shaft of the other assembly in coaxial relationship thereto.

13. The invention of claim 11, each assembly being provided with a third shaft rotatable alternately in opposite directions; a first variable speed pulley operably connected with the second shaft; a second variable speed pulley operably connected with the third shaft; a third belt interconnecting the pulleys; and control mechanism for said pulleys operably associated therewith.

14. The invention of claim 11, wherein each assembly is provided with a power transmitting unit having a pair of expansible pulleys, a third shaft, a third belt interconnecting the pulleys, each pulley having a pair of relatively shiftable sections whereby the diameters thereof may be varied, the sections of one pulley being spring-loaded relatively toward each other, and control mechanism operably connected with the other pulley for shifting its sections toward each other; and means operably coupling said unit with the second shaft and with the third shaft.

15. In a transmission, a drive shaft; a pair of secondary shafts; a pair of belt and pulley means operably coupled with said drive shaft for driving one of the secondary shafts in either of two directions; a pair of belt and pulley means operably coupled with said drive shaft for driving the other secondary shaft in either of two directions; and means for tightening the belts into operative connection with the secondary shafts.

16. The invention of claim 14, the second shaft of one of said assemblies being tubular and being telescoped over the second shaft of the other assembly in coaxial relationship thereto, said control mechanisms each including an expansible cam device having an element rotatable on said second shaft of the other assembly and engaging one of the corresponding sections of the other pulley.

17. For use with a vehicle having a pair of ground-engaging wheels, a transmission comprising a pair of assemblies each provided with a first grooved wheel adapted to be driven continuously in one direction, a second grooved wheel rotatable alternately in opposite directions, a first belt interconnecting the grooved wheels, control means provided with a first and a second sheave, and a second belt interconnecting the first grooved wheel and the second sheave, said control means being movable whereby to alternately shift the first sheave into tight engagement with the first belt, thereby driving the second grooved wheel in one direction, and to shift the second belt into tight engagement with the second grooved wheel, thereby driving the latter in the opposite direction; a first shaft common to the first grooved wheels and rigidly secured thereto for driving the same; and a second shaft secured rigidly to the second grooved wheel of each of said assemblies respectively to be driven thereby in opposite directions whereby, upon connection of the second shaft of each assembly with a corresponding ground-engaging wheel, the vehicle may be driven and steered fore or aft at variable speeds.

18. For use with a vehicle having a pair of ground-engaging wheels, a transmission comprising a pair of assemblies each provided with a first grooved wheel adapted to be driven continuously in one direction, a second grooved wheel rotatable alternately in opposite directions, a first belt interconnecting the grooved wheels, control means provided with a first and a second sheave, and a second belt interconnecting the first grooved wheel and the second sheave, said control means being movable whereby to alternately shift the first sheave into tight engagement with the first belt, thereby driving the second grooved wheel in one direction, and to shift the second grooved wheel in one direction, and to shift the second belt into tight engagement with the second grooved wheel, thereby driving the latter in the opposite direction; a first shaft common to the first grooved wheels and rigidly secured thereto for driving the same; and a second shaft secured rigidly to the second grooved wheel of each of said assemblies respectively to be driven thereby in opposite directions, each assembly being provided with a third shaft rotatable alternately in opposite directions; a first variable speed pulley operably connected with the second shaft; a second variable speed pulley operably connected with the third shaft; a third belt interconnecting the pulleys; and control mechanism for said pulleys operably associated therewith, whereby, upon connection of the third shaft of each assembly with a correponding ground-engaging wheel, the vehicle may be driven and steered fore or aft at variable speeds through manipulation of either the control means or the control mechanism or both.

References Cited in the file of this patent

UNITED STATES PATENTS

| | | |
|---|---|---|
| 1,197,090 | Adkins | Sept. 5, 1916 |
| 1,450,019 | Canning | Mar. 27, 1923 |
| 2,326,392 | Reeves | Aug. 10, 1943 |
| 2,582,966 | Curtis | Jan. 22, 1952 |
| 2,583,272 | Metzler | Jan. 22, 1952 |

FOREIGN PATENTS

| | | |
|---|---|---|
| 325,116 | Germany | Sept. 9, 1920 |